United States Patent [19]

Vobach

[11] Patent Number: 5,533,128
[45] Date of Patent: Jul. 2, 1996

[54] PSEUDO-RANDOM TRANSPOSITION CIPHER SYSTEM AND METHOD

[76] Inventor: Arnold Vobach, 11114 Ashcroft, Houston, Tex. 77096

[21] Appl. No.: 374,314

[22] Filed: Jan. 18, 1995

[51] Int. Cl.⁶ .................................. H04L 9/28; H04L 9/00
[52] U.S. Cl. .................................. 380/28; 380/46; 380/47; 380/49
[58] Field of Search .................................. 380/9, 21, 28, 380/36, 37, 42, 44, 46, 49, 47

[56] References Cited

U.S. PATENT DOCUMENTS

| | | | |
|---|---|---|---|
| 5,113,444 | 5/1992 | Vobach | 380/46 X |
| 5,193,115 | 3/1993 | Vobach | 380/46 |
| 5,307,412 | 4/1994 | Vobach | 380/42 |
| 5,335,280 | 8/1994 | Vobach | 380/42 |

*Primary Examiner*—Bernarr E. Gregory

[57] ABSTRACT

In a pseudo-random transposition cipher system and method, sender and receiver each have sets of corresponding identical pseudo-random number generators. To encrypt a message, the sender generates a pseudo-random initializing integer, transmitted along with the encrypted message. The sender, using a key secretly shared with the receiver, selects a set of seed integers for the pseudo-random number generators from the initializing integer. The first number generator produces a set of numerical synonyms (numerical codings) associated one-to-one with a set of sequentially indexed addresses of cardinality at least as great as that of the plaintext alphabet. The second number generator determines a one-to-one mapping of the plaintext alphabet into the set of addresses. Whenever a plaintext alphabet character appears in the message, the numerical synonym sharing the same address is used as the corresponding ciphertext character. After use of a plaintext character, a third number generator locates a new address so that the numerical synonym residing there can be transposed with the one last used for, and at the address of, the plaintext character. To decrypt, the receiver uses the secret key and initializing integer to recover the pseudo-random number generator seeds and undoes the encrypting process described above.

5 Claims, 2 Drawing Sheets

PSEUDO-RANDOM TRANSPOSITION CIPHER SYSTEM AND METHOD

FIELD OF INVENTION

The present invention relates generally to computing and data storage systems and methods. More particularly, the present invention relates to a cipher system and method for encrypting and decrypting computer data.

BACKGROUND OF THE INVENTION

Methods of encrypting a plaintext message often employ substitutions of integers for plaintext message characters according to a substitution table. (See, for example, U.S. Pat. Nos. 5,307,412 and 5,335,280. In these patents, the substituted integers are called "numerical synonyms.") to thwart chosen plaintext attacks or frequency analysis of encrypted messages, it may be desirable to "update" or alter the substitution table periodically. The present invention provides a procedure for doing this.

The notion of altering substitution tables with the encryption of each plaintext character is not a new one. The mechanical or electro-mechanical Hagelin machines of an earlier era are examples of this. (See, for example, pp. 411–434 of Danid Kahn's "The Codebreakers," Macmillan, N.Y., 1967). They and other related devices and schemes are, however, quite different in spirit from the present invention.

First, the variable stepping rotors of such devices effectively alter the entire substitution table each time a plaintext character is encrypted. While this is acceptable for small alphabets (of 26 characters in the American military M-209 machine) and where high speed is not a requirement, it is impractical for large alphabets and the needs of high speed computerized encryption. In the present invention the numerical synonym, the integer substituted for a plaintext character, is not replaced with another until that character is used (unless it was previously involved in a transposition for a previously occurring plaintext character). Algebraically, instead of generating a permutation of the whole set of numerical synonyms-a whole new substitution table-the method of the present invention merely applies a two-cycle to the existing permutation (substitution table) at each stage of plaintext character encryption.

Second, systems of the existing type known in the art fail to make provision for a substitution table of size greater than |A|×|A|, where |A| is the cardinality of the plaintext alphabet. An advantage of the present system is that it permits a substitution table of size the square of the cardinality of the set of addresses. This allows numerical synonyms for alphabet characters to be used and then to "disappear" for long stretches, thus degrading the statistics of repeated numerical synonym use.

Third, previous methods display the starting positions of the rotors (or their equivalents) in a fixed and ultimately determinable position in the ciphertext. In the present invention, the initializing seeds for the number generators, including the ones which determine the starting substitution table, are embedded in the initializing integer and can be recovered only by holders of the secret key.

A number generator (NG) may be either a pseudo-random number generator or it may be a secret, shared string of truly random digits. The "initializing seed" of the pseudo-random number generator then becomes the starting position index for the readout of a random digit string.

Terminology used in the sequel is drawn from that of U.S. Pat. No. 5,307,412.

SUMMARY OF THE INVENTION

A sender and receiver pair share corresponding collections of three number generators. To encrypt a plaintext message, the sender generates a pseudo-random integer with an NG generally different from the three referred to above. The sender then selects three integers formed from the binary bits of this first, initializing integer. The method of selecting these three integers from the sequence of bits of the initializing integer constitutes the secret key shared by sender and receiver. Call these three integers, determined from the initializing integer, "initializing seeds", numbered one through three.

NG1, initialized by seed 1, outputs a sequence of integers used to determine a number of distinct numerical synonyms. That this can be done is remarked upon in columns 2 and 3 of U.S. Pat. No. 5,307,412. The number of numerical synonyms should be greater than or equal to the number of characters in the plaintext alphabet used for message transmissions. For example, if a plaintext alphabet of 256 characters if used, 1024 distinct numerical synonyms might be generated. Let S be the number of distinct numerical synonyms generated.

NG2, initialized by seed 2, determines, by its output, a one-to-one embedding of the plaintext alphabet characters among the numbers 0 through S−1, S in all. If we call the cardinality of the plaintext alphabet A, there are $_SP_A$ ways of doing this. Effectively now also, the characters of the alphabet have been permuted.

There are now S "boxes" or addresses, each of which contains a numerical synonym or "alias" to conceal the serial listing (address) of the "box" and some of which contain also plaintext alphabet characters.

Now, as each successive plaintext alphabet character of the plaintext message to be encrypted is presented, the numerical synonym at the address where the character is found is substituted for the character. Before that alphabet character is used again, however, NG3, intialized by seed 3, generates a pseudo-random number, which, modulo S, determines a new address between 0 and S−1. (If desired, if the new address is that of the character used, the process can be repeated until a different address is found.) The numerical synonyms at the old and the new addresses are interchanged, or transposed, so that the aforementioned plaintext alphabet character will next be represented (or substituted for) by another numerical synonym. Alternatively, the numerical synonyms can remain at their original addresses, and the alphabet characters can be switched (if there is one at the new address as well as the old), or the aforementioned alphabet character can simply be moved to the new address (if there is no other character already at that address).

The point in using numerical synomyms, instead of serial address numbers, 0 through S−1, as numerical codings for alphabet characters is this: If an attacker sees, as the ciphertext string integer, a sequence of integers from the set {0, 1, 2, . . . ,S−1}, it might enable him to determine how NG3 successively manipulates the codings for the alphabet characters. The numerical synonyms are "aliases" for the addresses.

The reason for using more addresses (and hence more numerical synonyms) than there are alphabet characters is to allow numerical synonyms to "disappear" from the ciphertext string corresponding to the plaintext message string either permanently or at least for long stretches, making an attack by frequency analysis even more difficult. It also permits an easy initial permutation of the order of the alphabet characters as they are embedded into the integers 0 through S−1.

The string of numerical synonyms successively substituted for plaintext message characters by the process described above constitutes the ciphertext, or ciphertext string integer, or ciphertext string for the message. The ciphertext may be further superencrypted, as for example, by the addition of a random or pseudo-random masking tape integer (as described in U.S. Pat. No. 5,307,412). Whether superencrypted or not, the ciphertext string is preceded, in transmission to the receiver, by the initializing integer. The initializing integer followed by the ciphertext string integer constitutes the cryptogram.

To avoid propagation of errors in this scheme, the plaintext alphabet may be encrypted and then decrypted to check for accumulated errors either periodically or at the end of each message encryption.

To decrypt, the receiver, having the initializing integer, and hence access to the seeds, proceeds as follows: The receiver generates the numerical synonyms (and their assignments to their initial addresses) by means of NG1, initialized by seed 1. The distribution of the alphabet characters among the S addresses is determined by NG2, initialized by seed 2.

Now the receiver can determine the first character of the plaintext message and knows the numerical synonyms for subsequent occurrences of it and the other characters by using the output of NG3, initialized by seed 3.

As in U.S. Pat. No. 5,307,412, the ciphertext string can be adulterated by prefixing, suffixing, or by interchanging blocks of digits—all by prior arrangement between sender and receiver.

Instead of pseudo-random number generators, sender and receiver may use one or more long, shared random digit strings. Instead of being used as initializing seeds for number generators, the three integers derived from the initializing integer by the key may be used to determine starting or indexing positions for readouts from the shared digit strings.

Sources of pseudo-random or truly random digit strings will be referred to as number generators (NG's) in the drawings and descriptions of the embodiments.

DETAILED DESCRIPTION OF PREFERRED EMBODIMENTS

Figure 1:
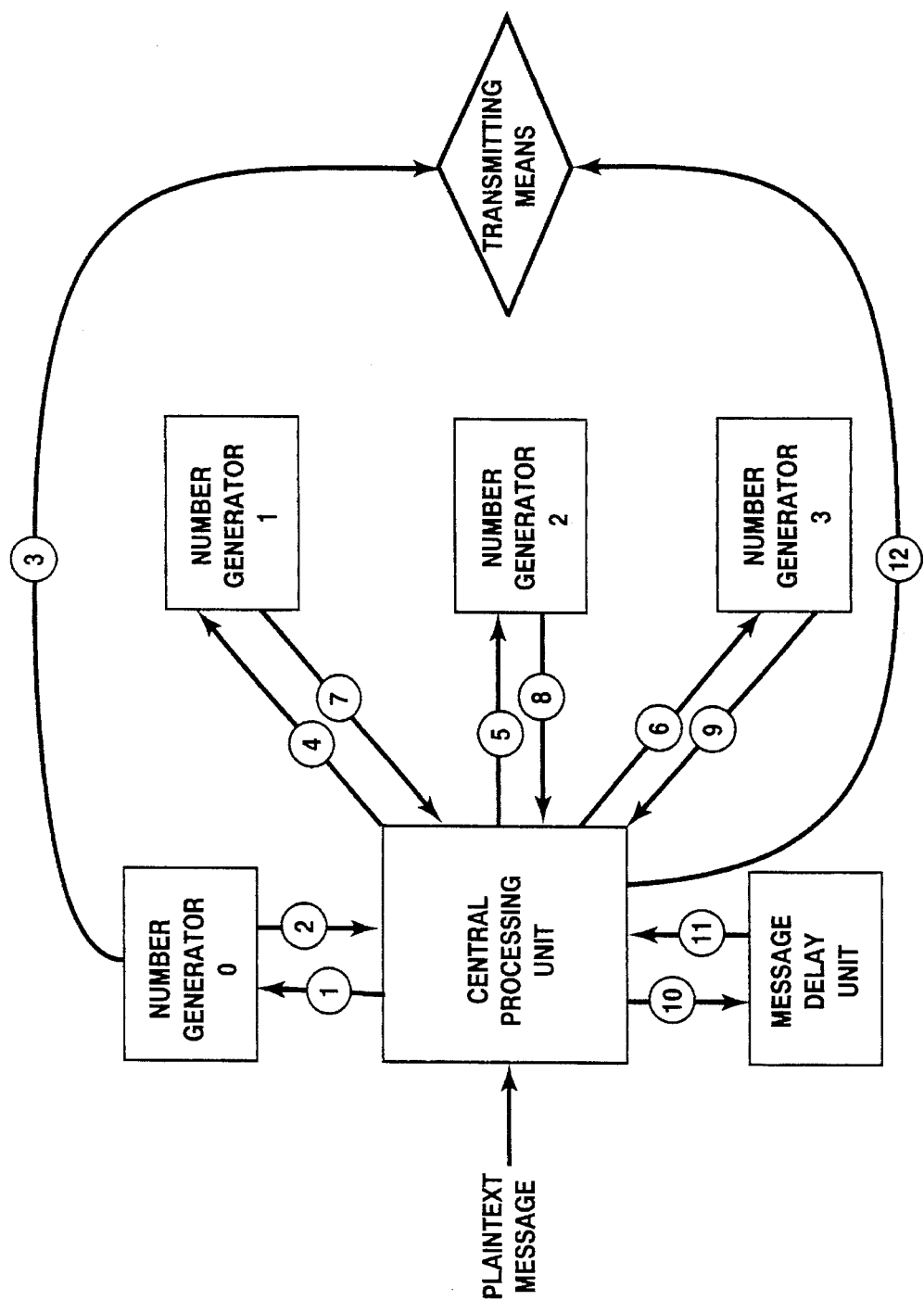
FIG. 1 is a flowchart illustrating the encryption of a plaintext message by a preferred embodiment of the invention.

With reference to FIG. 1, upon receipt of the first character of a plaintext message, the Central Processing Unit (CPU) instructs Number Generator 0 (NG0), by link 1, to produce a pseudo-random initializing integer which NG0 returns to the CPU by link 2 and sends to the transmitting means by link 3.

The CPU extracts the intializing seeds 1, 2, and 3 and sends them, respectively, to NG1, NG2 and NG3 by links 4, 5, and 6, respectively. Number Generator 1, NG1, returns, by link 7, a string of digits from which the CPU extracts distinct integers of a common fixed length to serve as numerical synonyms. The ordinal numbers of the sequence of numerical synonyms are their addresses, and the numerical synonyms and their addresses are stored for future access by the CPU.

Number Generator 2, NG2, initialized by seed 2, returns to the CPU, by link 8, a string of digits which the CPU uses to distribute the characters of the plaintext alphabet randomly or pseudo-randomly among the S-many addresses associated with the numerical synonyms.

While the CPU is loading numerical synonyms and alphabet characters, the first few plaintext characters are sent, by link 10, to the message delay unit (MDU) or buffer. When the CPU is ready to translate them into numerical synonyms, they are sent back to the CPU by link 11. Number Generator 3, NG3, initialized by seed 3, returns to the CPU, via link 9, a string of digits which the CPU utilizes to determine successive required interchanges of numerical synonyms between addresses.

The CPU sends the concatenated string of numerical synonyms, the ciphertext, to the transmitting means by link 12. The initializing integer followed by the ciphertext constitutes the cryptogram and is transmitted to the receiver.

Figure 2:
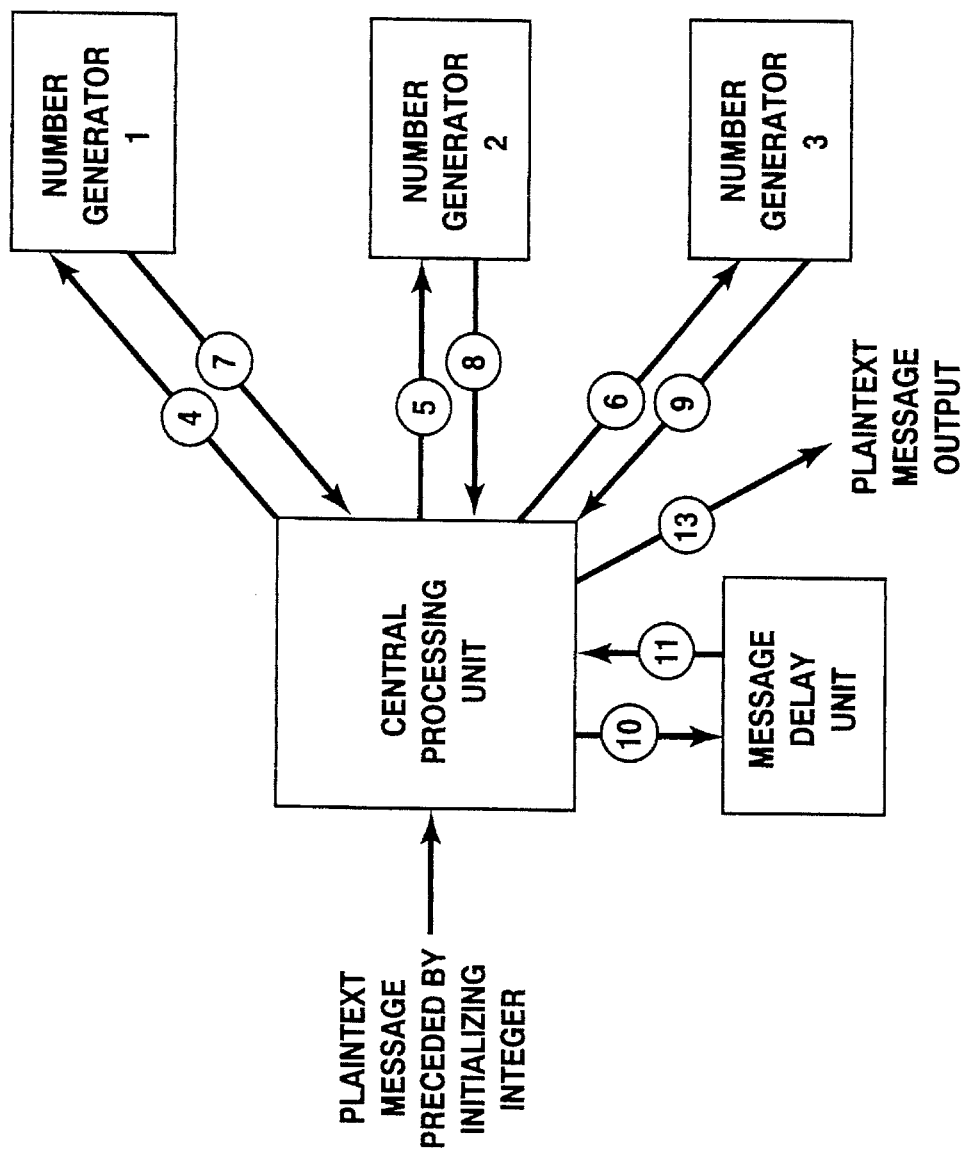
FIG. 2 is a flowchart illustrating the decryption of a received cryptogram by an apparatus similar to that of FIG. 1.

As shown in FIG. 2, upon receipt of an encrypted message preceded by its initializing integer, the CPU extracts the initializing seeds 1 through 3 and sends them, via links 4, 5 and 6, to NG1, NG2 and NG3, respectively. NG1, seeded by seed 1, returns by link 7, a string of digits from which the CPU extracts the numerical synonyms to be used as "aliases" for the serially numbered addresses. The numerical synonyms and their addresses are stored for future access by the CPU.

NG2 returns, by link 8, a string of digits to the CPU which the CPU uses to embed the plaintext alphabet characters into the set of (S-many) addresses associated with the numerical synonyms.

While the CPU is loading numerical synonyms and plaintext alphabet characters into their addresses, the first portion of the ciphertext is sent by link 10 to the MDU. When the CPU is ready to decrypt the message, this digit string is sent back to the CPU by link 11.

NG3, intialized by seed 3, received from the CPU by link 6, returns to the OPU, by link 9, a strong of digits which the CPU utilizes to determine successive required interchanges of numerical synonyms between addresses.

The CPU, utilizing the outputs of NG's 1, 2, and 3 to determine the numerical synonyms at each address, the disposition of the alphabet characters among the addresses and the successive interchanges of numerical synonyms, respectively, decrypts the message and outputs the plaintext message to, e.g., a printer, by link 13.

The principles, preferred embodiments, and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

I claim:

1. A cipher system for use by a sender and a receiver, comprising:

a. a source of plaintext alphabet characters:

b. a sender central processing unit to receive a plaintext message of plaintext alphabet characters from the source and to encode each character, the central processing unit comprising:

i. means for assigning a pseudo-randomly determined numerical synonym to each address from a serially numbered collection, of cardinality at least as great as that of the plaintext alphabet;

ii. means for pseudo-randomly assigning an address to each plaintext alphabet character; and iii. means for inducing a transpostion of the numerical synonym used to represent the plaintext character with the numerical synonym at another address by each use of a plaintext alphabet character;

the sender central processing unit further comprising a memory unit to store the addresses and their assigned numerical synonyms and plaintext alphabet characters;

c. a sender number generator to develop an initializing integer, transmitted to the receiver, which the sender central processing unit uses to determine the choices of the numerical synonyms, the assignment of alphabet characters to addresses, and the generation of transpositions of numerical synonyms;

d. a first number generator for each of the sender and receiver to generate a digit string to be used by sender and receiver to determine the sequence of numerical synonyms to be assigned to the sequentially labeled addresses;

e. a second number generator for each of the sender and receiver to generate a digit string to be used by sender and receiver to determine the assignment of plaintext alphabet characters to addresses;

f. a third number generator for each of the sender and receiver to generate a digit string to be used by sender and receiver to determine the transpositions of numerical synonyms associated with successive uses of plaintext alphabet characters;

g. a receiver central processing unit to receive an encrypted message and, utilizing the initializing integer and secret key, to decrypt each message, the receiver central processing unit comprising:

i. means for determining distinct numerical synonyms to be associated with each of the set of addresses of a set of addresses equal in number to those of the sender central processing unit, the numerical synonyms provided from a string of digits available to both sender and receiver;

ii. means for further assigning the plaintext alphabet characters to distinct addresses as determined by a digit string available to both sender and receiver;

iii. means for providing for the transposition of the numerical synonyms of plaintext alphabet characters, after each successive use of each alphabet character, with those at other addresses, as determined by a digit string available to both sender and receiver; and iv. means for reproducing the plaintext message, having determined the correct alphabet characters to be associated with the received numerical synonyms;

the receiver central processing unit further comprising a memory to store the addresses and their assigned numerical synonyms and plaintext alphabet characters; and h. a message delay unit for each of the sender and receiver central processing units to buffer alphabet characters or digit strings received by the sender or receiver central processing units, respectively.

2. The system of claim 1, wherein the initializing integer is transmitted with the encrypted message.

3. A cryptographic method between a sender and a receiver, the method comprising the steps of:

a. generating a pseudo-random initializing integer, by which, using a shared secret key, the sender and the receiver initialize number generators to determine their outputs and, hence, the choices of numerical synonyms, the assignment of alphabet characters to addresses, and the generation of transpositions of numerical synonyms;

b. generating a plaintext alphabet, each character of which is pseudo-randomly assigned its own unique address from a set of addresses, the cardinality of the set of addresses being at least as great as that of the plaintext alphabet;

c. assigning pseudo-randomly and one-to-one and onto, a set of distinct numerical synonyms to the set of addresses; and d. determining pseudo-randomly a transposition of numerical synonyms between addresses each time a plaintext alphabet character appears in a plaintext message.

4. The method of claim 3, wherein the initializing integer is transmitted with the encrypted message.

5. The method of claim 3, wherein the sources for pseudo-randomly determining numerical synonyms, assignment of alphabet characters to addresses and transpositions of numerical synonyms are pseudo-random number generators or shared strings of random digits.

* * * * *